No. 760,714. PATENTED MAY 24, 1904.
W. A. TURBAYNE.
SYSTEM OF ELECTRICAL DISTRIBUTION.
APPLICATION FILED NOV. 2, 1903.
NO MODEL.
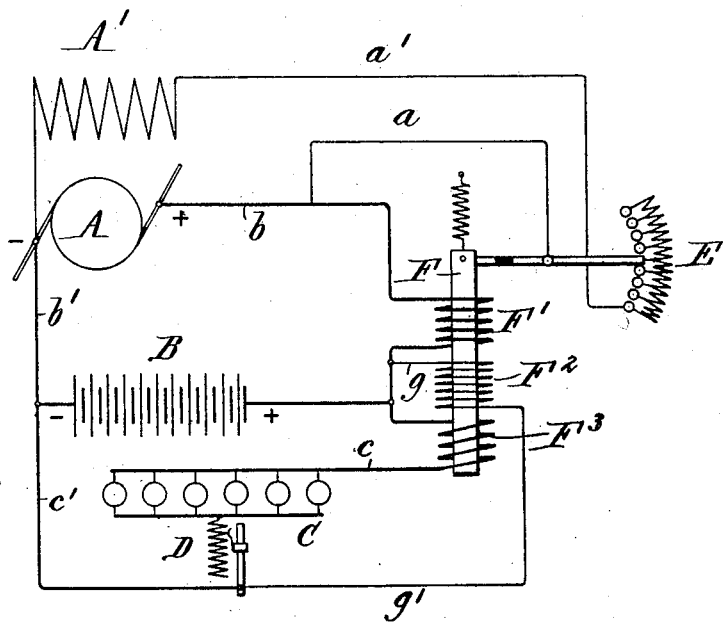
Witnesses:
E. A. Volk.
P. W. Pumsen.
William A. Turbayne Inventor.
By Wilhelm Bonner
Attorneys.

No. 760,714.

Patented May 24, 1904.

UNITED STATES PATENT OFFICE.

WILLIAM A. TURBAYNE, OF LANCASTER, NEW YORK, ASSIGNOR TO CHARLES M. GOULD, OF NEW YORK, N. Y.

SYSTEM OF ELECTRICAL DISTRIBUTION.

SPECIFICATION forming part of Letters Patent No. 760,714, dated May 24, 1904.

Application filed November 2, 1903. Serial No. 179,489. (No model.)

*To all whom it may concern:*

Be it known that I, WILLIAM A. TURBAYNE, a citizen of the United States, residing at Lancaster, in the county of Erie and State of New York, have invented new and useful Improvements in Systems of Electrical Distribution, of which the following is a specification.

This invention relates to the automatic regulation of electrical systems of distribution in which the dynamo or main generator is driven at a variable speed and a storage battery is employed which is charged by the dynamo and serves to supply current to the lamps or other translating devices when the dynamo is out of action or its output is insufficient to maintain the lights or translating devices.

The invention is particularly applicable to electric-lighting systems for railway-cars in which the dynamo is driven by one of the car-axles.

The object of the invention is to provide means whereby the strength of the dynamo-field is automatically varied to regulate the output of the dynamo, which varies with the changes in the speed of the dynamo-armature, to reduce the output of the generator when the charging of the battery has proceeded sufficiently far for its electromotive force to have reached a predetermined value, so that only the necessary amount of power will be expended and the battery will not be overcharged, and also to vary the field strength of the dynamo to increase or decrease the output of the latter as the load on the work-circuit is increased or decreased by turning on or off all or part of the lamps, so that the burning of the lamps will not impede the charging of the battery.

The accompanying drawing illustrates diagrammatically an electric-lighting system embodying the invention.

A represents the main generator, which may be a dynamo of any suitable type and the armature of which is driven at a variable speed; B, the storage battery, which is connected across the external or work circuit $b\ b'$, and C incandescent lamps connected in multiple or other translating devices in the lamp branch $c\ c'$ of the external circuit, which is connected to both the dynamo and battery and is supplied by either the dynamo or battery, or both.

D represents an ordinary automatic resistance device in series with the lamps and which acts to vary the pressure of the lamp-circuit as the lamps are turned on or off to prevent fluctuation in the light.

The dynamo illustrated is of the shunt type, its field A' being included in the shunt connection $a\ a'$. E represents a rheostat or other resistance device for varying the resistance in the field-shunt to increase or decrease the electromotive force of the dynamo in a well-known manner.

The field-resistance device is automatically controlled directly or indirectly through the medium of mechanical or electrical instrumentalities by a solenoid or magnet F. The latter has three windings—a coarse-wire winding F' in series with the work-circuit between the dynamo and storage battery and traversed by the full current in said circuit, a second winding $F^2$, of fine wire, connected in a shunt $g\ g'$ across the storage battery and acting cumulatively with said first winding F' to magnetize and move the solenoid-core in a direction to increase the resistance in the dynamo-field shunt, and a third winding $F^3$, of coarse wire, in series with the lamps and wound in such a manner as to act differentially relative to the other windings F' and $F^2$. This third winding tends to neutralize the magnetic effects of said other two windings, thereby permitting the solenoid-core to move in a direction to more or less decrease the resistance in the field-shunt and so increase the output of the dynamo when the lamps are turned on or lamp-load is added to the work-circuit.

The operation of the system is as follows: Assuming the lamp branch of the circuit to be open and the lamps not burning, the current from the dynamo A flows through the supply-circuit $b\ b'$ and first coarse-wire winding F' of the solenoid included therein to the battery to charge the latter. The said winding is thus energized, and the system is so adjusted that if the output of the dynamo rises above the desired normal value on account of the increased speed of its armature the increased energization of the solenoid-winding F' will cause the core to move in a direction to introduce sufficient resistance in the dynamo-field-shunt to reduce the output to the normal, whereas if the output falls below the normal by reason of the decreased speed of the dynamo-armature the solenoid-core will be permitted to move in the opposite direction to reduce the resistance in the field-shunt and increase the output. A practically constant normal value of the current of the dynamo sufficient to charge the battery is thus maintained. As the charging proceeds the battery electromotive force rises, thereby increasing the magnetic effect of the fine shunt-winding $F^2$ of the solenoid until when the charging has continued far enough to render a reduction of current desirable the magnetization of the shunt-winding, acting in conjunction with the primary winding F', is sufficient to move the solenoid-core to increase the field resistance and lower the output of the generator. When the lights C are turned on or lamp-load is added to the work-circuit, the current then traversing the lamp-circuit and third winding $F^3$ of the solenoid will on account of its differential action relative to the other two windings neutralize or counteract to a greater or less extent the effect of the other two solenoid-windings and permit the core to again move in the direction to decrease the resistance in the field-shunt and increase the dynamo output. Thus the output of the dynamo is kept at the desired value for the work which it has to perform. The current is reduced as the battery electromotive force increases, so that the battery is charged under ideal conditions and there is no waste of energy, and, too, the output of the dynamo is increased and decreased in accordance with the load added to or taken from the work-circuit.

I claim as my invention—

1. In an electrical system, the combination with a dynamo and external circuit, of translating devices, and a storage battery in said circuit, means for regulating the dynamo-field strength, and a magnetic controlling device for said regulating means having differentially-acting windings respectively connected with the supply and work portions of the circuit, and a third winding connected in shunt across the storage battery substantially as set forth.

2. In an electrical system, the combination with a dynamo and an external circuit, of translating devices, and a storage battery in said circuit, means for regulating the dynamo-field strength, and a solenoid controlling said regulating means and having differentially-acting windings respectively connected with the supply and work portions of the external circuit, and a third winding connected in shunt across the battery and acting cumulatively with one of said other windings, substantially as set forth.

3. In an electrical system the combination with a dynamo and external circuit, of translating devices and a storage battery connected in multiple in said circuit, a device for varying the resistance in said dynamo-field; and a magnet controlling said resistance-varying device and having differentially-acting windings respectively connected in series with the supply and work portions of the external circuit, and a third winding connected in shunt across said storage battery, substantially as set forth.

Witness my hand this 19th day of October, 1903.

WILLIAM A. TURBAYNE.

Witnesses:
   CHAS. N. PARKER,
   C. M. BENTLEY.